United States Patent
Liu et al.

(10) Patent No.: US 7,810,652 B2
(45) Date of Patent: Oct. 12, 2010

(54) METHOD TO IMPROVE THE SELECTIVITY OF POLYBENZOXAZOLE MEMBRANES

(75) Inventors: Chunqing Liu, Schaumburg, IL (US); Raisa Minkov, Skokie, IL (US); Man-Wing Tang, Cerritos, CA (US); Lubo Zhou, Inverness, IL (US); Jeffery C. Bricker, Buffalo Grove, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/566,834

(22) Filed: Sep. 25, 2009

(65) Prior Publication Data

US 2010/0133190 A1 Jun. 3, 2010

(51) Int. Cl.
*B01D 71/64* (2006.01)
*B01D 71/28* (2006.01)
*B01D 69/00* (2006.01)

(52) U.S. Cl. .............................. 210/500.39; 210/500.34

(58) Field of Classification Search ........................ None
See application file for complete search history.

(56) References Cited

U.S. PATENT DOCUMENTS

| | | | |
|---|---|---|---|
| 3,133,132 A | 5/1964 | Loeb et al. | |
| 4,230,463 A | 10/1980 | Henis et al. | |
| 4,717,393 A | 1/1988 | Hayes | |
| 4,855,048 A | 8/1989 | Tang et al. | |
| 4,877,528 A | 10/1989 | Friesen et al. | |
| 5,409,524 A | 4/1995 | Jensvold et al. | |
| 5,679,131 A | 10/1997 | Obushenko | |
| 5,837,032 A | 11/1998 | Moll et al. | |
| 6,368,382 B1 | 4/2002 | Chiou | |
| 6,626,980 B2 | 9/2003 | Hasse et al. | |
| 7,048,846 B2 | 5/2006 | White et al. | |
| 7,166,146 B2 | 1/2007 | Miller et al. | |
| 7,485,173 B1 | 2/2009 | Liu et al. | |
| 2004/0097695 A1* | 5/2004 | Yoon .......................... | 528/350 |
| 2005/0268782 A1 | 12/2005 | Kulkarni et al. | |
| 2006/0138042 A1* | 6/2006 | Okamoto et al. ............ | 210/490 |
| 2007/0022877 A1 | 2/2007 | Marand et al. | |
| 2008/0300336 A1 | 12/2008 | Liu et al. | |
| 2009/0277327 A1* | 11/2009 | Zhou et al. ..................... | 95/51 |
| 2009/0297850 A1* | 12/2009 | Jung et al. .................. | 428/398 |

FOREIGN PATENT DOCUMENTS

WO WO 91/16123 10/1991

OTHER PUBLICATIONS

U.S. Appl. No. 12/412,629, filed Mar. 27, 2009, Liu et al.
U.S. Appl. No. 12/412,633, filed Mar. 27, 2009, Liu et al.
U.S. Appl. No. 12/412,639, filed Mar. 27, 2009, Liu et al.
U.S. Appl. No. 12/412,643, filed Mar. 27, 2009, Liu et al.
U.S. Appl. No. 12/412,647, filed Mar. 27, 2009, Liu et al.
U.S. Appl. No. 12/412,649, filed Mar. 27, 2009, Liu et al.
U.S. Appl. No. 12/412,653, filed Mar. 27, 2009, Liu et al.
Yaghi, Omar M. et al, Metal-organic frameworks: a new class of porous materials, Microporous & Mesoporous. Mater., 73: 3 (2004) pp. 3-14.
Barsema, J.N. et al., "Intermediate polymer to carbon gas separation membranes based on Matrimid PI", J. Membr. Science, 238: 93 (2004) pp. 93-102.
Yaghi, Omar M. et al., Systematic Design of Pore Size and Functionality in Isoreticular MOFs & Their Application in Methane Storage, Science, 295: 469 (2002.
Dybtsev, Danil N. et al., Rigid and Flexible: A Highly Porous Metal0Organic Framework with Unusual Guest-Dependent Dynamic Behavior, Angew. Chem. Int. Ed., 43: 5033 (2004).
Tullos, Gordon L. et al., "Thermal Conversion of Hydroxy-Containing Imides to Benzoxazoles: Polymer and Model Compound Study", Macromolecules, 32, 3598 (1999).
Ho Bum Park et al., "Polymers with Cavities Tuned for Fast Selective Transport of Small Molecules and Ions", Science, 318, 254 (2007).

\* cited by examiner

*Primary Examiner*—Krishnan S Menon
(74) *Attorney, Agent, or Firm*—Mark Goldberg

(57) ABSTRACT

The present invention discloses a novel method to improve the selectivities of polybenzoxazole (PBO) membranes prepared from aromatic polyimide membranes for gas, vapor, and liquid separations. The PBO membranes that were prepared by thermal treating aromatic polyimide membranes containing between 0.05 and 20 wt-% of a poly(styrene sulfonic acid) polymer. These polymers showed up to 95% improvement in selectivity for $CO_2/CH_4$ and $H_2/CH_4$ separations compared to PBO membranes prepared from corresponding aromatic polyimide membranes without a poly(styrene sulfonic acid) polymer.

3 Claims, No Drawings

METHOD TO IMPROVE THE SELECTIVITY OF POLYBENZOXAZOLE MEMBRANES

BACKGROUND OF THE INVENTION

This invention pertains to a method to improve the selectivity of polymer membranes and their use for gas, vapor and liquid separations. More particularly, this invention pertains to a method to improve the selectivity of polybenzoxazole membranes prepared from aromatic polyimide membranes for gas, vapor, and liquid separations through the addition of a poly(styrene sulfonic acid) polymer in the preparation of polybenzoxazole membranes.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications have achieved commercial success, including carbon dioxide removal from natural gas and from biogas and enhanced oil recovery, and also in hydrogen removal from nitrogen, methane, and argon in ammonia purge gas streams. For example, UOP's Separex™ cellulose acetate polymeric membrane is currently an international market leader for carbon dioxide removal from natural gas.

The membranes most commonly used in commercial gas separation applications are polymeric and nonporous. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases $\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and high selectivity are desirable because higher permeability decreases the size of the membrane area required to treat a given volume of gas, thereby decreasing capital cost of membrane units, and because higher selectivity results in a higher purity product gas.

Polymers provide a range of properties including low cost, good permeability, mechanical stability, and ease of processability that are important for gas separation. A polymer material with a high glass-transition temperature ($T_g$), high melting point, and high crystallinity is preferred. Glassy polymers (i.e., polymers at temperatures below their $T_g$) have stiffer polymer backbones and therefore let smaller molecules such as hydrogen and helium pass through more quickly, while larger molecules such as hydrocarbons pass through glassy polymers more slowly as compared to polymers with less stiff backbones. However, polymers which are more permeable are generally less selective than less permeable polymers. A general trade-off has always existed between permeability and selectivity (the so-called polymer upper bound limit). Over the past 30 years, substantial research effort has been directed to overcoming the limits imposed by this upper bound. Various polymers and techniques have been used, but without much success. In addition, traditional polymer membranes also have limitations in terms of thermal stability and contaminant resistance.

Cellulose acetate (CA) glassy polymer membranes are used extensively in gas separation. Currently, such CA membranes are used commercially for natural gas upgrading, including the removal of carbon dioxide. Although CA membranes have many advantages, they are limited in a number of properties including selectivity, permeability, and in chemical, thermal, and mechanical stability. It has been found that polymer membrane performance can deteriorate quickly. A primary cause of loss of membrane performance is liquid condensation on the membrane surface. Condensation can be prevented by providing a sufficient dew point margin for operation, based on the calculated dew point of the membrane product gas. UOP's MemGuard™ system, a regenerable adsorbent system that uses molecular sieves, was developed to remove water as well as heavy hydrocarbons from the natural gas stream, hence, to lower the dew point of the stream. The selective removal of heavy hydrocarbons by a pretreatment system can significantly improve the performance of the membranes. Although these pretreatment systems can effectively perform this function, the cost is quite significant. In some projects, the cost of the pretreatment system was as high as 10 to 40% of the total cost (pretreatment system and membrane system) depending on the feed composition. Reduction of the size of the pretreatment system or even total elimination of the pretreatment system would significantly reduce the membrane system cost for natural gas upgrading. Another factor is that, in recent years, more and more membrane systems have been installed in large offshore natural gas upgrading projects. The footprint is a big constraint for offshore projects. The footprint of the pretreatment system is very high at more than 10 to 50% of the footprint of the whole membrane system. Removal of the pretreatment system from the membrane system has great economic impact, especially to offshore projects.

High-performance polymers such as polyimides (PIs), poly(trimethylsilylpropyne) (PTMSP), and polytriazole have been developed to improve membrane selectivity, permeability, and thermal stability. These polymeric membrane materials have shown promising properties for separation of gas pairs such as $CO_2/CH_4$, $O_2/N_2$, $H_2/CH_4$, and propylene/propane ($C_3H_6/C_3H_8$). However, current polymeric membrane materials have reached a limit in their productivity-selectivity trade-off relationship. In addition, gas separation processes based on the use of glassy solution-diffusion membranes frequently suffer from plasticization of the polymer matrix by the sorbed penetrant molecules such as $CO_2$ or $C_3H_6$. Plasticization of the polymer as demonstrated by membrane structure swelling and significant increases in the permeabilities of all components in the feed occurs above the plasticization pressure when the feed gas mixture contains condensable gases.

Aromatic polybenzoxazoles (PBOs), polybenzothiazoles (PBTs), and polybenzimidazoles (PBIs) are highly thermally stable ladderlike glassy polymers with flat, stiff, rigid-rod phenylene-heterocyclic ring units. The stiff, rigid ring units in such polymers pack efficiently, leaving very small penetrant-accessible free volume elements that are desirable to provide polymer membranes with both high permeability and high selectivity. These aromatic PBO, PBT, and PBI polymers, however, have poor solubility in common organic solvents, preventing them from being used for making polymer membranes by the most practical solvent casting method.

Thermal conversion of soluble aromatic polyimides containing pendent functional groups ortho to the heterocyclic imide nitrogen in the polymer backbone to aromatic polybenzoxazoles (PBDs) or polybenzothiazoles (PBTs) has been found to provide an alternative method for creating PBO or PBT polymer membranes that are difficult or impossible to obtain directly from PBO or PBT polymers by solvent casting method. (Tullos et al, MACROMOLECULES, 32, 3598 (1999)) A recent publication in the journal SCIENCE reported high permeability polybenzoxazole polymer membranes for gas separations (Ho Bum Park et al, SCIENCE 318, 254 (2007)). These polybenzoxazole membranes are prepared from high temperature thermal rearrangement of hydroxy-containing polyimide polymer membranes containing pendent hydroxyl groups ortho to the heterocyclic imide nitrogen. These polybenzoxazole polymer membranes exhibited extremely high $CO_2$ permeability which is about 10-100 times better than conventional polymer membranes. However, the $CO_2/CH_4$ selectivities of these polybenzoxazole polymer membranes were similar to conventional polymer membranes. Improving the selectivities of these new polybenzoxazole polymer membranes is still needed to make new commercially viable membranes with higher separation efficiency than current commercial polymer membranes. The authors in this publication in the journal SCIENCE tried to increase the selectivity of these polybenzoxazole polymer membranes by adding small acid molecules (e.g., HCl and $H_3PO_4$). However, the stability of the small acid molecules in these polybenzoxazole polymer membranes has been found to be a critical issue for commercial use.

The present invention provides a method to improve the selectivity of polybenzoxazole membranes by the introduction of a polymer containing aromatic sulfonic acid groups such as poly(styrene sulfonic acid) polymer.

SUMMARY OF THE INVENTION

This invention pertains to a novel method to improve the selectivity of polybenzoxazole (PBO) membranes prepared from aromatic polyimide membranes for gas, vapor, and liquid separations.

The PBO membranes of the present invention were prepared by thermal cyclization of the aromatic polyimide membranes containing poly(styrene sulfonic acid) polymer in a temperature range of 300° to 650° C. under inert atmosphere. The aromatic polyimide membranes were prepared from a mixture of poly(styrene sulfonic acid) polymer and aromatic polyimide polymers comprising pendent hydroxyl groups ortho to the imide nitrogen in the polymer backbone.

The PBO membranes prepared by thermal treating aromatic polyimide membranes containing poly(styrene sulfonic acid) polymer showed up to 95% improvement in selectivities for $CO_2/CH_4$ and $H_2/CH_4$ separation compared to the PBO membranes prepared from the corresponding aromatic polyimide membranes without poly(styrene sulfonic acid) polymer.

These PBO membranes provide ease of processability, high mechanical stability, high selectivity, and high permeance. The PBO membranes described in the present invention can have either a nonporous symmetric structure or an asymmetric structure with a thin selective layer supported on top of a porous support layer. These membranes can be fabricated into any convenient geometry such as flat sheet (or spiral wound), disk, tube, hollow fiber, or thin film composite.

The invention also provides a process for separating at least one gas or liquid from a mixture of gases or liquids using these PBO membranes. The process comprises providing a PBO membrane that is permeable to at least one gas or liquid; contacting the mixture of gases or liquids on one side of the PBO membrane with improved selectivity to cause at least one gas or liquid to permeate the PBO membrane with improved selectivity; and removing from the opposite side of the membrane a permeate gas or liquid composition that is a portion of at least one gas or liquid which permeated the membrane.

These PBO membranes are not only suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, $H_2S/CH_4$, olefin/paraffin, iso/normal paraffins separations, and other light gas mixture separations, but also can be used for other applications such as for catalysis and fuel cell applications.

DETAILED DESCRIPTION OF THE INVENTION

It has been found in the present invention that the selectivity of polybenzoxazole membranes can be significantly improved by the introduction of about 0.05 to 20 wt-% poly (styrene sulfonic acid) polymer to the aromatic polyimide membranes that are used for making polybenzoxazole membranes by thermal cyclization. The PBO membranes prepared by thermal treating aromatic polyimide membranes containing poly(styrene sulfonic acid) polymer showed up to 95% improvement in selectivities for $CO_2/CH_4$ separation and up to 130% improvement in selectivities for $H_2/CH_4$ separation compared to the PBO membranes prepared from the corresponding aromatic polyimide membranes without poly(styrene sulfonic acid) polymer.

The PBO membranes described in the present invention exhibit ease of processability, high mechanical stability, high selectivity, and high permeance.

The present invention provides a method for the production of high performance polybenzoxazole membranes with improved selectivity for gas, vapor, and liquid separations including the steps of first fabricating an aromatic polyimide membrane from a mixture of poly(styrene sulfonic acid) polymer and an aromatic polyimide polymer comprising pendent hydroxyl groups ortho to the imide nitrogen in the polymer backbone, and then converting the aromatic polyimide membrane to a polybenzoxazole membrane by heating it between 300° and 650° C. under an inert atmosphere, such as argon, nitrogen, or a vacuum. In some cases a membrane post-treatment step can be added after the formation of the polybenzoxazole membrane in which the selective layer surface of the polybenzoxazole membrane is coated with a thin layer of high permeability material such as a polysiloxane, a fluoro-polymer, a thermally curable silicone rubber, or a UV radiation curable epoxy silicone.

The aromatic polyimide membranes that are used for the preparation of polybenzoxazole membranes are fabricated from a mixture of poly(styrene sulfonic acid) polymer and aromatic polyimide polymers comprising pendent hydroxyl groups ortho to the imide nitrogen in the polymer backbones by a solution casting or solution spinning method or other method as known to those of ordinary skill in the art. Preferably the poly(styrene sulfonic acid) is about 0.02 to 20 wt-% of the mixture and more preferably the poly(styrene sulfonic acid) is 1 to 10 wt-% of the mixture. Thermal cyclization of the aromatic polyimide polymers results in the formation of polybenzoxazole, and is accompanied by a loss of carbon dioxide with no other volatile byproducts being generated. The polybenzoxazole polymers in the polybenzoxazole membranes comprise the repeating units of a formula (I), wherein said formula (I) is:

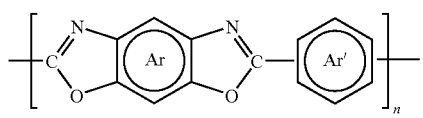
(I)

where

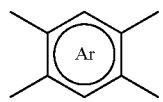

is selected from the group consisting of

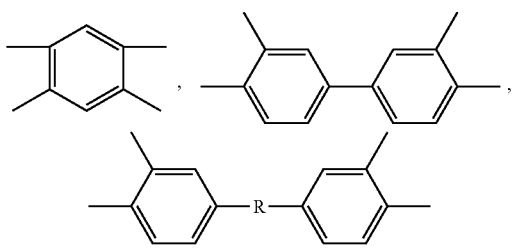

and mixtures thereof, —R— is selected from the group consisting of

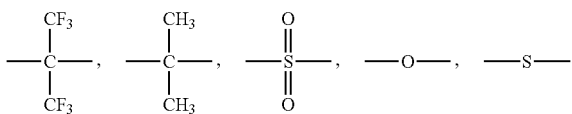

and mixtures thereof, and

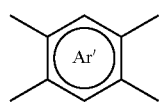

is selected from the group consisting of

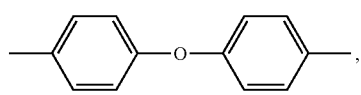

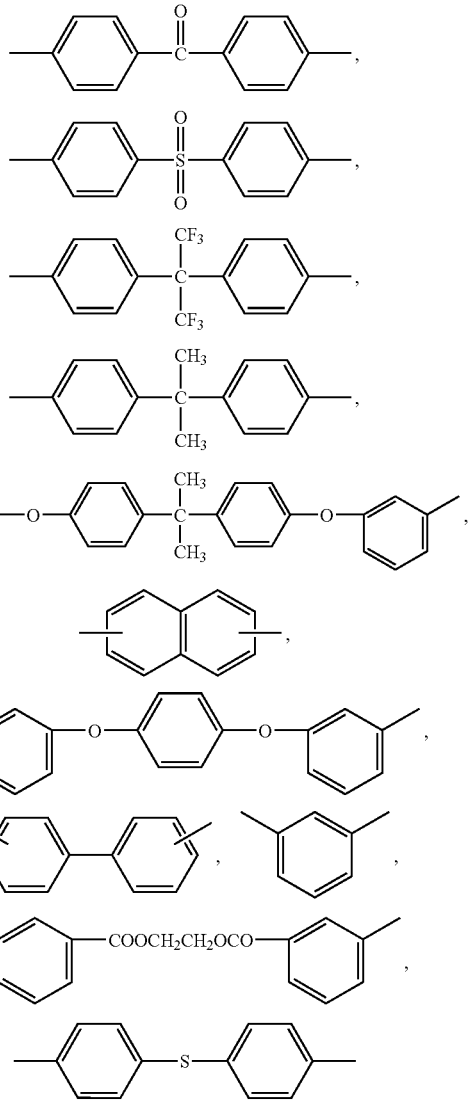

and mixtures thereof.

The aromatic polyimides comprising pendent hydroxyl groups ortho to the heterocyclic imide nitrogen in the polymer backbone that are used for the preparation of the polybenzoxazole membranes comprise a plurality of first repeating units of a formula (II), wherein formula (II) is:

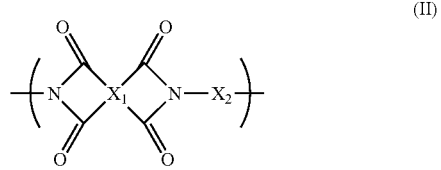
(II)

where —$X_1$— of formula (II) is selected from the group consisting of

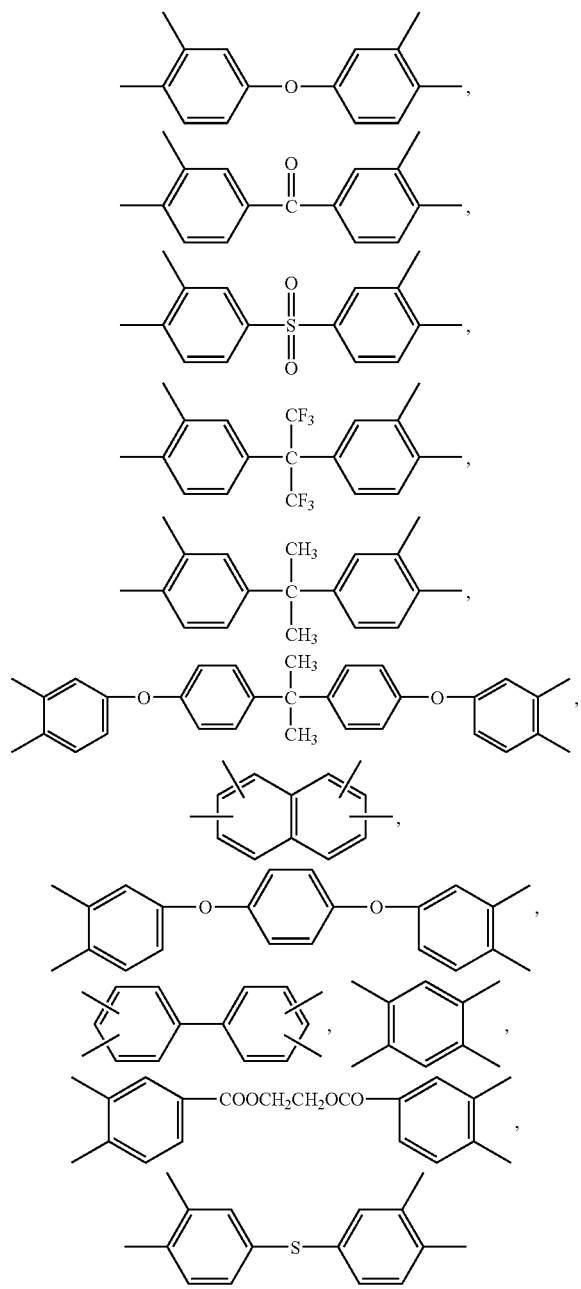

and mixtures thereof, —X$_2$— of formula (II) is selected from the group consisting of

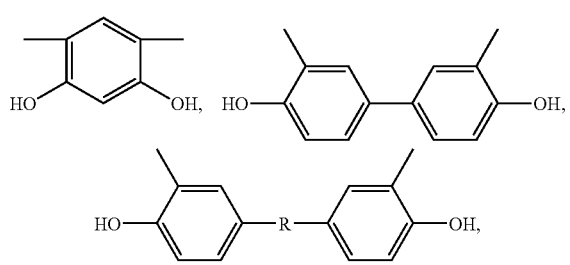

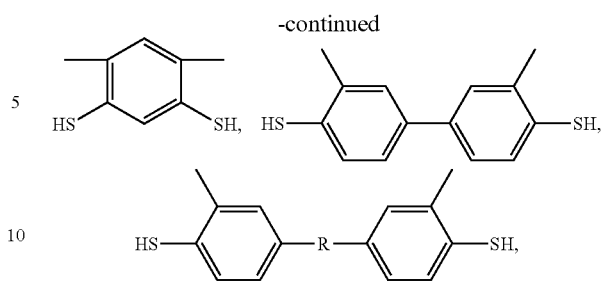

and mixtures thereof, and —R— is selected from the group consisting of

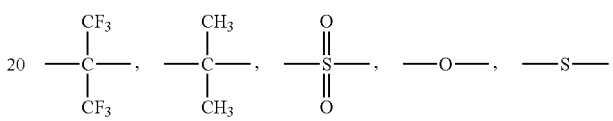

and mixtures thereof.

The preferred aromatic polyimide polymers comprising pendent hydroxyl groups ortho to the imide nitrogen in the polymer backbones, that are used for the preparation of high performance polybenzoxazole membranes with improved selectivities in the present invention include, but are not limited to, poly[2,2'-bis-(3,4-dicarboxyphenyl)hexafluoropropane dianhydride-2,2-bis(3-amino-4-hydroxyphenyl)-hexafluoropropane](poly(6FDA-APAF)), poly[3,3',4,4'-benzophenonetetracarboxylic dianhydride-2,2-bis(3-amino-4-hydroxyphenyl)-hexafluoropropane] (poly(BTDA-APAF)), poly(3,3',4,4'-benzophenonetetracarboxylic dianhydride-3,3'-dihydroxy-4,4'-diamino-biphenyl) (poly (BTDA-HAB)), poly[4,4'-oxydiphthalic anhydride-2,2-bis(3-amino-4-hydroxyphenyl)-hexafluoropropane] (poly (ODPA-APAF)), poly[3,3',4,4'-diphenylsulfone tetracarboxylic dianhydride-2,2-bis(3-amino-4-hydroxyphenyl)-hexafluoropropane] (poly(DSDA-APAF)), poly(3,3',4,4'-diphenylsulfone tetracarboxylic dianhydride-3,3'-dihydroxy-4,4'-diamino-biphenyl) (poly(DSDA-HAB)), poly[2,2'-bis-(3,4-dicarboxyphenyl)hexafluoropropane dianhydride-3,3',4,4'-benzophenonetetracarboxylic dianhydride-2,2-bis(3-amino-4-hydroxyphenyl)-hexafluoropropane] (poly(6FDA-BTDA-APAF)), poly[4,4'-oxydiphthalic anhydride-2,2-bis(3-amino-4-hydroxyphenyl)-hexafluoropropane-3,3'-dihydroxy-4,4'-diamino-biphenyl] (poly(ODPA-APAF-HAB)), poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl] (poly(BTDA-APAF-HAB)), poly[2,2'-bis-(3,4-dicarboxyphenyl)hexafluoropropane dianhydride-3,3'-dihydroxy-4,4'-diamino-biphenyl] (poly(6FDA-HAB)), poly(4,4'-bisphenol A dianhydride-3,3',4,4'-benzophenonetetracarboxylic dianhydride-2,2-bis(3-amino-4-hydroxyphenyl)-hexafluoropropane (poly(BPADA-BTDA-APAF)), and mixtures thereof The aromatic polyimide membrane can be fabricated into a membrane with nonporous symmetric thin film geometry from a mixture of poly(styrene sulfonic acid) polymer and an aromatic polyimide polymer by casting a homogeneous solution of poly(styrene sulfonic acid) polymer and an aromatic polyimide polymer on top of a clean glass plate and allowing the solvent to evaporate slowly inside a plastic cover for at least 12 hours at room temperature. The membrane is then detached from the glass plate and dried at room temperature for about 24 hours and then at 200° C. for at least 48 hours under vacuum.

The solvents used for dissolving poly(styrene sulfonic acid) and aromatic polyimide polymer are chosen primarily for their ability to completely dissolve the polymers and for ease of solvent removal in the membrane formation steps. Other considerations in the selection of solvents include low toxicity, low corrosive activity, low environmental hazard potential, availability and cost. Representative solvents for use in this invention include most amide solvents, such as N-methylpyrrolidone (NMP) and N,N-dimethyl acetamide (DMAC), methylene chloride, tetrahydrofuran (THF), acetone, N,N-dimethylformamide (DMF), dimethyl sulfoxide (DMSO), toluene, dioxanes, 1,3-dioxolane, mixtures thereof, others known to those skilled in the art and mixtures thereof.

The aromatic polyimide membrane can also be fabricated by a method comprising the steps of: dissolving the poly(styrene sulfonic acid) polymer and the aromatic polyimide polymer in a solvent to form a solution; contacting a porous membrane support (e.g., a support made from inorganic ceramic material) with this solution; and then evaporating the solvent to provide a thin selective layer comprising the poly(styrene sulfonic acid) polymer and the aromatic polyimide polymer materials on the supporting layer.

The aromatic polyimide membranes can be fabricated as an asymmetric membrane with a flat sheet or hollow fiber geometry by phase inversion followed by direct air drying through the use of at least one drying agent which is a hydrophobic organic compound such as a hydrocarbon or an ether (see U.S. Pat. No. 4,855,048) and can also be fabricated as an asymmetric membrane with flat sheet or hollow fiber geometry by phase inversion followed by solvent exchange (see U.S. Pat. No. 3,133,132).

The aromatic polyimide membrane containing poly(styrene sulfonic acid) polymer is then converted to a polybenzoxazole polymer membrane by heating between 300° and 650° C., preferably from about 350° to 500° C. and most preferably from about 350° to 450° C. under an inert atmosphere, such as argon, nitrogen, or vacuum. The heating time for this heating step is in a range of about 30 seconds to 2 hours. A more preferred heating time is from about 30 seconds to 1 hour.

In some cases a membrane post-treatment step can be added after the formation of the polybenzoxazole polymer membrane with the application of a thin layer of a high permeability material such as a polysiloxane, a fluoro-polymer, a thermally curable silicone rubber, or a UV radiation curable epoxy silicone. The coating filling the surface pores and other imperfections comprising voids (see U.S. Pat. No. 4,230,463; U.S. Pat. No. 4,877,528; and U.S. Pat. No. 6,368,382).

The high performance polybenzoxazole polymer membranes with improved selectivities of the present invention can have either a nonporous symmetric structure or an asymmetric structure with a thin nonporous dense selective layer supported on top of a porous support layer. The porous support can be made from the same polybenzoxazole polymer material or a different type of organic or inorganic material with high thermal stability. The polybenzoxazole polymer membranes with improved selectivities of the present invention can be fabricated into any convenient geometry such as flat sheet (or spiral wound), disk, tube, hollow fiber, or thin film composite.

The invention provides a process for separating at least one gas or liquid from a mixture of gases or liquids using the polybenzoxazole polymer membranes with improved selectivity prepared from aromatic polyimide membranes containing poly(styrene sulfonic acid) polymer, the process comprising: (a) providing a polybenzoxazole membrane as described in the present invention which is permeable to at least one gas or liquid; (b) contacting the mixture to one side of the polybenzoxazole membrane to cause at least one gas or liquid to permeate the polybenzoxazole membrane; and (c) then removing from the opposite side of the membrane a permeate gas or liquid composition comprising a portion of at least one gas or liquid which permeated the membrane.

These polybenzoxazole membranes are especially useful in the purification, separation or adsorption of a particular species in the liquid or gas phase. In addition to separation of pairs of gases, these polybenzoxazole membranes may be used for the desalination of water by reverse osmosis or for the separation of proteins or other thermally unstable compounds, e.g. in the pharmaceutical and biotechnology industries. The polybenzoxazole membranes may also be used in fermenters and bioreactors to transport gases into the reaction vessel and transfer cell culture medium out of the vessel. Additionally, the polybenzoxazole membranes may be used for the removal of microorganisms from air or water streams, water purification, ethanol production in a continuous fermentation/membrane pervaporation system, and in detection or removal of trace compounds or metal salts in air or water streams.

The polybenzoxazole membranes of the present invention are especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the polybenzoxazole membranes described herein. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 0.7 bar or as high as 145 bar (about 10 psi or as high as about 2100 psi) depending on many factors such as the particular membrane used, the flow rate of the inlet stream and the availability of a compressor to compress the permeate stream if such compression is desired. Differential pressure greater than about 145 bar (2100 psi) may rupture the membrane. A differential pressure of at least 7 bar (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the membranes will range from about −20° to about 100° C., and most preferably, the effective operating temperature will range from about 25° to about 100° C.

The polybenzoxazole membranes are especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which these polybenzoxazole membranes with improved selectivities may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The polybenzoxazole membranes may incorporate a species that adsorbs strongly to certain gases (e.g. cobalt porphyrins or phthalocyanines for $O_2$ or silver(I) for ethane) to facilitate their transport across the membrane.

The polybenzoxazole membranes can be operated at a high temperature to provide sufficient dew point margin for natural gas upgrading (e.g, $CO_2$ removal from natural gas). The polybenzoxazole membranes can be used in either a single stage membrane or as the first and/or second stage membrane in a two stage membrane system for natural gas upgrading. The polybenzoxazole membranes may be operated without a costly pretreatment system. Hence, a costly membrane pretreatment system such as an adsorbent system would not be required in the new process containing the polybenzoxazole membrane system. Due to the elimination of the pretreatment system and the significant reduction of membrane area, the new process can achieve significant capital cost saving and reduce the existing membrane footprint.

These polybenzoxazole membranes may also be used in the separation of liquid mixtures by pervaporation, such as in the removal of organic compounds (e. g., alcohols, phenols, chlorinated hydrocarbons, pyridines, ketones) from water such as aqueous effluents or process fluids. A polybenzoxazole membrane which is ethanol-selective can be used to increase the ethanol concentration in relatively dilute ethanol solutions (5-10% ethanol) obtained by fermentation processes. Another liquid phase separation example using these polybenzoxazole membranes is the deep desulfurization of gasoline and diesel fuels by a pervaporation membrane process similar to the process described in U.S. Pat. No. 7,048, 846, incorporated herein by reference in its entirety. Polybenzoxazole membranes that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using the polybenzoxazole membranes with improved selectivities include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

The polybenzoxazole membranes may be used for separation of organic molecules from water (e.g. ethanol and/or phenol from water by pervaporation) and removal of metal and other organic compounds from water.

The polybenzoxazole membranes have immediate application for the separation of gas mixtures including carbon dioxide removal from natural gas. The membrane permits carbon dioxide to diffuse through at a faster rate than the methane in the natural gas. Carbon dioxide has a higher permeation rate than methane because of higher solubility, higher diffusivity, or both. Thus, carbon dioxide enriches on the permeate side of the membrane, and methane enriches on the feed (or reject) side of the membrane.

The polybenzoxazole membranes also have application to the concentration of olefins in a paraffin/olefin stream for olefin cracking applications. For example, the polybenzoxazole membranes can be used for propylene/propane separation to increase the concentration of the effluent in a catalytic dehydrogenation reaction for the production of propylene from propane and isobutylene from isobutane. Therefore, the number of stages of propylene/propane splitter that is required to get polymer grade propylene can be reduced. Another application for the polybenzoxazole membranes is for separating isoparaffin and normal paraffin in light paraffin isomerization and MaxEne™, a UOP LLC process for enhancing the concentration of normal paraffin (n-paraffin) in a naphtha cracker feedstock, which can be then converted to ethylene.

An additional application of the polybenzoxazole membranes is as the separator in chemical reactors to enhance the yield of equilibrium-limited reactions by selective removal of a specific substance.

In summary, the polybenzoxazole membranes of the present invention that are prepared from aromatic polyimide membranes containing poly(styrene sulfonic acid) polymer are suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, $H_2S/CH_4$, olefin/paraffin, iso/normal paraffins separations, and other light gas mixture separations.

EXAMPLES

The following examples are provided to illustrate one or more preferred embodiments of the invention, but are not limited embodiments thereof. Numerous variations can be made to the following examples that lie within the scope of the invention.

Example 1

Preparation of poly(6FDA-HAB)/poly(BTDA-APAF-HAB) blend polymer membrane

A poly(6FDA-HAB)/poly(BTDA-APAF-HAB) blend polymer membrane was prepared from poly(6FDA-HAB) and poly(BTDA-APAF-HAB) polymers with 1:1 weight ratio. The poly(6FDA-HAB) polymer was synthesized from 2,2'-bis-(3,4-dicarboxyphenyl)hexafluoropropane dianhydride and 3,3'-dihydroxy-4,4'-diamino-biphenyl via a polycondensation reaction. The poly(BTDA-APAF-HAB) polymer was synthesized from 3,3',4,4'-benzophenonetetracarboxylic dianhydride, 2,2-bis(3-amino-4-hydroxyphenyl)-hexafluoropropane, and 3,3'-dihydroxy-4,4'-diamino-biphenyl via a polycondensation reaction. A molar ratio of 3,3',4,4'-benzophenonetetracarboxylic dianhydride, 2,2-bis(3-amino-4-hydroxyphenyl)-hexafluoropropane, and 3,3'-dihydroxy-4,4'-diamino-biphenyl is 3:2:1. 2.5 g of poly(6FDA-HAB) and 2.5 g of poly(BTDA-APAF-HAB) were dissolved in a solvent mixture of 16.0 g of NMP and 9.0 g of 1,3-dioxolane. The mixture was mechanically stirred for 2 hours to form a homogeneous casting dope. The resulting homogeneous casting dope was allowed to degas overnight. The poly(6FDA-HAB)/poly(BTDA-APAF-HAB) blend polymer membrane was prepared from a bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form poly(6FDA-HAB)/poly(BTDA-APAF-HAB) blend polymer membrane (abbreviated as PI(6FDA-HAB/BTDA-APAF-HAB)).

Example 2

Preparation of poly(6FDA-HAB)/poly(BTDA-APAF-HAB) blend polymer membrane containing poly(styrene sulfonic acid) polymer A poly(6FDA-HAB)/poly(BTDA-APAF-HAB) blend polymer membrane containing poly(styrene sulfonic acid) polymer was prepared as follows: 1.25 g of poly(6FDA-HAB) and 1.25 g of poly(BTDA-APAF-HAB) were dissolved in a solvent mixture of 8.0 g of NMP and 4.5 g of 1,3-dioxolane. The mixture was mechanically stirred for 2 hours to form a homogeneous casting dope. Then 0.2 g of poly(styrene sulfonic acid) polymer was added to the casting dope under stirring. The casting dope was stirred for another 1 hour. The resulting homogeneous casting dope was allowed to degas overnight. The poly(6FDA-HAB)/poly(BTDA-APAF-HAB) blend polymer membrane containing poly(styrene sulfonic acid) polymer was prepared from a bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form poly(6FDA-HAB)/poly(BTDA-APAF-HAB) blend polymer containing poly(styrene sulfonic acid) polymer (abbreviated as PI(6FDA-HAB/BTDA-APAF-HAB)-PSSA).

Example 3

Preparation of polybenzoxazole polymer membrane PBO (6FDA-HAB/BTDA-APAF-HAB)-350

The polybenzoxazole polymer membrane PBO(6FDA-HAB/BTDA-APAF-HAB)-350 was prepared by thermally heating the PI(6FDA-HAB/BTDA-APAF-HAB) polymer membrane prepared in Example 1 from 50° to 350° C. at a heating rate of 3° C./min under $N_2$ flow. The membrane was held for 1 hour at 350° C. and then cooled down to 50° C. at a heating rate of 3° C./min under $N_2$ flow.

Example 4

Preparation of polybenzoxazole polymer membrane PBO(6FDA-HAB/BTDA-APAF-HAB)-400

The polybenzoxazole polymer membrane PBO(6FDA-HAB/BTDA-APAF-HAB)-400 was prepared by thermally heating the PI(6FDA-HAB/BTDA-APAF-HAB) polymer membrane prepared in Example 1 from 50° to 400° C. at a heating rate of 3° C./min under $N_2$ flow. The membrane was held for 1 hour at 400° C. and then cooled down to 50° C. at a heating rate of 3° C./min under $N_2$ flow.

Example 5

Preparation of polybenzoxazole polymer membrane PBO(6FDA-HAB/BTDA-APAF-HAB)-PSSA-350

The polybenzoxazole polymer membrane PBO(6FDA-HAB/BTDA-APAF-HAB)-PSSA-350 was prepared by thermally heating the PI(6FDA-HAB/BTDA-APAF-HAB)-PSSA polymer membrane prepared in Example 2 from 50° to 350° C. at a heating rate of 3° C./min under $N_2$ flow. The membrane was held for 1 hour at 350° C. and then cooled down to 50° C. at a heating rate of 3° C./min under $N_2$ flow.

Example 6

Preparation of polybenzoxazole polymer membrane PBO(6FDA-HAB/BTDA-APAF-HAB)-PSSA-400

The polybenzoxazole polymer membrane PBO(6FDA-HAB/BTDA-APAF-HAB)-PSSA-400 was prepared by thermally heating the PI(6FDA-HAB/BTDA-APAF-HAB)-PSSA polymer membrane prepared in Example 2 from 50° to 400° C. at a heating rate of 3° C./min under $N_2$ flow. The membrane was held for 1 hour at 400° C. and then cooled down to 50° C. at a heating rate of 3° C./min under $N_2$ flow.

Example 7

Preparation of comparable polybenzoxazole polymer membrane PBO(6FDA-HAB/BTDA-APAF-HAB)-PSOH-400

A poly(6FDA-HAB)/poly(BTDA-APAF-HAB) blend polymer membrane containing poly(o-hydroxy styrene) (PSOH) was prepared as follows: 1.25 g of poly(6FDA-HAB) and 1.25 g of poly(BTDA-APAF-HAB) were dissolved in a solvent mixture of 8.0 g of NMP and 4.5 g of 1,3-dioxolane. The mixture was mechanically stirred for 2 hours to form a homogeneous casting dope. Then 0.2 g of PSOH polymer was added to the casting dope under stirring. The casting dope was stirred for another 1 hour. The resulting homogeneous casting dope was allowed to degas overnight. The poly(6FDA-HAB)/poly(BTDA-APAF-HAB) blend polymer membrane containing PSOH polymer was prepared from a bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C.

under vacuum for at least 48 hours to completely remove the residual solvents to form poly(6FDA-HAB)/poly(BTDA-APAF-HAB) blend polymer containing PSOH polymer (abbreviated as PI(6FDA-HAB/BTDA-APAF-HAB)-PSOH).

The comparable polybenzoxazole polymer membrane PBO(6FDA-HAB/BTDA-APAF-HAB)-PSOH-400 was prepared by thermally heating the PI(6FDA-HAB/BTDA-APAF-HAB)-PSOH polymer membrane from 50° to 400° C. at a heating rate of 3° C./min under $N_2$ flow. The membrane was held for 1 hour at 400° C. and then cooled down to 50° C. at a heating rate of 3° C./min under $N_2$ flow.

Example 8

Preparation of comparable polybenzoxazole polymer membrane PBO(6FDA-HAB/BTDA-APAF-HAB)-TSA-400

The comparable polybenzoxazole polymer membrane PBO(6FDA-HAB)/BTDA-APAF-HAB)-TSA-400 membrane containing toluene sulfonic acid (TSA) was prepared using a procedure same as that used in Example 7 except that the same amount of TSA acid was used to replace PSOH when the membrane was prepared.

Example 9

$CO_2/CH_4$ separation performance of PBO(6FDA-HAB/BTDA-APAF-HAB)-350, PBO(6FDA-HAB/BTDA-APAF-HAB)-PSSA-350, PBO(6FDA-HAB/BTDA-APAF-HAB)-400, PBO(6FDA-HAB/BTDA-APAF-HAB)-PSSA-400, PBO(6FDA-HAB/BTDA-APAF-HAB)-PSOH-400, and PBO(6FDA-HAB/BTDA-APAF-HAB)-TSA-400 polymer membranes The PBO(6FDA-HAB/BTDA-APAF-HAB)-350, PBO(6FDA-HAB/BTDA-APAF-HAB)-PSSA-350, PBO(6FDA-HAB/BTDA-APAF-HAB)-400, PBO(6FDA-HAB/BTDA-APAF-HAB)-PSSA-400, PBO(6FDA-HAB/BTDA-APAF-HAB)-PSOH-400, and PBO(6FDA-HAB/BTDA-APAF-HAB)-TSA-400 polymer membranes were tested for $CO_2/CH_4$ separation under testing temperatures of 50° C. and 100° C., respectively (Table 1). It can be seen from Table 1 that the PBO polymer membrane PBO(6FDA-HAB/BTDA-APAF-HAB)-PSSA-350 prepared from PI(6FDA-HAB/BTDA-APAF-HAB)-PSSA membrane containing poly(styrene sulfonic acid) polymer at 350° C. has $CO_2/CH_4$ selectivity of 51.2, which is 34% higher than the PBO polymer membrane PBO(6FDA-HAB/BTDA-APAF-HAB)-350 prepared from PI(6FDA-HAB/BTDA-APAF-HAB) membrane without poly(styrene sulfonic acid) polymer. Similarly, the PBO polymer membrane PBO(6FDA-HAB/BTDA-APAF-HAB)-PSSA-400 prepared from PI(6FDA-HAB/BTDA-APAF-HAB)-PSSA membrane containing poly(styrene sulfonic acid) polymer at 400° C. has $CO_2/CH_4$ selectivity of 38.3, which is 95% higher than the PBO polymer membrane PBO(6FDA-HAB/BTDA-APAF-HAB)-300 prepared from PI(6FDA-HAB/BTDA-APAF-HAB) membrane without poly(styrene sulfonic acid) polymer.

For comparison purpose, another polymer, poly(o-hydroxy styrene) (PSOH), which has the same polymer chain as poly(styrene sulfonic acid) polymer but without sulfonic acid functional groups, has been added to the PBO polymer membrane as mentioned in Example 7. The amount of the PSOH used for making PBO(6FDA-HAB/BTDA-APAF-HAB)-PSOH-400 membrane in Example 7 is the same as that of poly(styrene sulfonic acid) in PBO(6FDA-HAB/BTDA-APAF-HAB)-PSSA-400 PBO membrane prepared in Example 6. It can be seen from the results in Table 1 that the addition of poly(o-hydroxy styrene) to PBO membrane did not provide improved selectivity as was observed for the PBO(6FDA-HAB/BTDA-APAF-HAB)-PSSA-400 PBO membrane. These results suggest that the sulfonic acid groups on the poly(styrene sulfonic acid) polymer have played a critical role for the selectivity improvement. In addition, a small sulfonic acid compound, toluene sulfonic acid (TSA), was added to the PBO polymer membrane with the same amount as mentioned in Example 8. The results showed decreased $CO_2$ permeability and no improvement in selectivity compared to those of the PBO(6FDA-HAB/BTDA-APAF-HAB)-PSSA-400 PBO membrane (see Table 1). A possible reason for the advantage of the poly(styrene sulfonic acid) polymer compared to the toluene sulfonic acid small compound is that the toluene sulfonic acid decomposed at much lower temperature than the poly(styrene sulfonic acid) and it was not effective during high temperature heat treatment for making PBO membranes

TABLE 1

Pure Gas Permeation Test Results of PBO(6FDA-HAB/BTDA-APAF-HAB)-350, PBO(6FDA-HAB/BTDA-APAF-HAB)-PSSA-350, PBO(6FDA-HAB/BTDA-APAF-HAB)-400, PBO(6FDA-HAB/BTDA-APAF-HAB)-PSSA-400, PBO(6FDA-HAB/BTDA-APAF-HAB)-PSOH-400, and PBO(6FDA-HAB/BTDA-APAF-HAB)-TSA-400 Polymer Membranes for $CO_2/CH_4$ Separation [a]

| Membrane | $P_{CO2}$ (Barrer) | $\alpha_{CO2/CH4}$ |
|---|---|---|
| PBO(6FDA-HAB/BTDA-APAF-HAB)-350 | 12.2 | 38.1 |
| PBO(6FDA-HAB/BTDA-APAF-HAB)-PSSA-350 | 10.0 | 51.2 |
| PBO(6FDA-HAB/BTDA-APAF-HAB)-400 | 108.5 | 19.6 |
| PBO(6FDA-HAB/BTDA-APAF-HAB)-PSSA-400 | 80.1 | 38.3 |
| PBO(6FDA-HAB/BTDA-APAF-HAB)-PSOH-400 | 74.5 | 21.8 |
| PBO(6FDA-HAB/BTDA-APAF-HAB)-TSA-400 | 49.5 | 22.8 |

[a] $P_{CO2}$ and $P_{CH4}$ were tested at 50° C. and 690 kpa (100 psig); 1 Barrer = $10^{-10}$ cm$^3$(STP) · cm/cm$^2$ · sec · cmHg.

Example 10

$H_2/CH_4$ separation performance of PBO(6FDA-HAB/BTDA-APAF-HAB)-350, PBO(6FDA-HAB/BTDA-APAF-HAB)-PSSA-350, PBO(6FDA-HAB/BTDA-APAF-HAB)-400, and PBO(6FDA-HAB/BTDA-APAF-HAB)-PSSA-400 polymer membranes The PBO(6FDA-HAB/BTDA-APAF-HAB)-350, PBO(6FDA-HAB/BTDA-APAF-HAB)-PSSA-350, PBO(6FDA-HAB/BTDA-APAF-HAB)-400, and PBO(6FDA-HAB/BTDA-APAF-HAB)-PSSA-400 polymer membranes were tested for $H_2/CH_4$ separation under 50° C. testing temperature (Table 2). It can be seen from Table 2 that the PBO polymer membrane PBO(6FDA-HAB/BTDA-APAF-HAB)-PSSA-350 prepared from PI(6FDA-HAB/BTDA-APAF-HAB)-PSSA membrane containing poly(styrene sulfonic acid) polymer at 350° C. has $H_2/CH_4$ selectivity of 224, which is 58% higher than the PBO polymer membrane PBO(6FDA-HAB/BTDA-APAF-HAB)-350 prepared from PI(6FDA-HAB/BTDA-APAF-HAB) membrane without poly(styrene sulfonic acid) polymer. Similarly, the PBO polymer membrane PBO(6FDA-HAB/BTDA-APAF-HAB)-PSSA-400 prepared from PI(6FDA-HAB/BTDA-APAF-HAB)-PSSA membrane containing poly(styrene sulfonic acid) polymer at 400° C. has $H_2/CH_4$ selectivity of 84.6, which is 130% higher than the PBO polymer membrane PBO(6FDA-HAB/BTDA- APAF-HAB)-400 prepared from PI(6FDA-HAB/BTDA-APAF-HAB) membrane without poly(styrene sulfonic acid) polymer.

TABLE 2

Pure Gas Permeation Test Results of PBO(6FDA-HAB/BTDA-APAF-HAB)-350, PBO(6FDA-HAB/BTDA-APAF-HAB)-PSSA-350, PBO(6FDA-HAB/BTDA-APAF-HAB)-400, and PBO(6FDA-HAB/BTDA-APAF-HAB)-PSSA-400 Polymer Membranes for $H_2/CH_4$ Separation[a]

| Membrane | $P_{H2}$ (Barrer) | $\alpha_{H2/CH4}$ |
|---|---|---|
| PBO(6FDA-HAB/BTDA-APAF-HAB)-350 | 45.5 | 141.9 |
| PBO(6FDA-HAB/BTDA-APAF-HAB)-PSSA-350 | 43.7 | 224 |
| PBO(6FDA-HAB/BTDA-APAF-HAB)-400 | 203.9 | 36.8 |
| PBO(6FDA-HAB/BTDA-APAF-HAB)-PSSA-400 | 176.8 | 84.6 |

[a] $P_{H2}$ and $P_{CH4}$ were tested at 50° C. and 690 kPa (100 psig);
1 Barrer = $10^{-10}$ cm$^3$(STP) · cm/cm$^2$ · sec · cmHg.

The invention claimed is:

1. A membrane comprising a mixture of an aromatic polyimide polymer and a poly(styrene sulfonic acid) polymer wherein said aromatic polyimide polymer comprises a plurality of first repeating units of a formula (II), wherein formula (II) is:

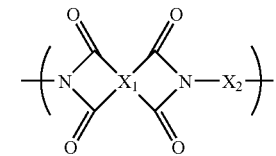

where —$X_1$— of formula (II) is

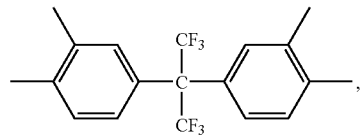

and —$X_2$— of formula (II) is

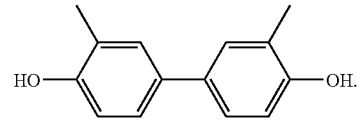

2. The membrane of claim 1 comprising about 0.05 to 20 wt-% of poly(styrene sulfonic acid).

3. The membrane of claim 1 wherein said membrane is in a configuration selected from the group consisting of a flat sheet, a disk, a tube hollow fiber and a thin film composite.

* * * * *